United States Patent Office 2,770,645
Patented Nov. 13, 1956

2,770,645

PURIFICATION OF ACRYLONITRILE

David W. McDonald, Texas City, and Keith M. Taylor, La Marque, Tex., assignors to Monsanto Chemical Company, St. Louis, Mo., a corporation of Delaware No Drawing. Application December 29, 1954, Serial No. 478,496

7 Claims. (Cl. 260—465.9)

This invention relates to acrylonitrile and more specifically to a process for its purification.

Acrylonitrile is a well known article of commerce and is widely used in the preparation of various types of synthetic resins and fibers. It is also a valuable intermediate in the preparation of other organic compounds. In most applications, particularly when used in the preparation of synthetic resins or fibers, it is necessary that acrylonitrile of exceptional purity be used. Most of the processes used for the preparation of acrylonitrile simultaneously produce, in addition to acrylonitrile, minor amounts of carbonyl-containing compounds, particularly methyl vinyl ketone. Acrylonitrile containing minor quantities of methyl vinyl ketone is unsatisfactory for many applications.

It is an object of this invention to provide a process for the purification of acrylonitrile.

It is a particular object of this invention to provide a process for the removable of minor amounts of methyl vinyl ketone from acrylonitrile.

Additional objects will become apparent from the description of the process of this invention.

It has now been discovered that the methyl vinyl ketone content of acrylonitrile containing minor amounts of methyl vinyl ketone can be substantially reduced by treating the thus contaminated acrylonitride with a minor amount of a compound selected from the group consisting of the alkali metal, alkaline earth metal and ammonium bisulfites. The treatment can be carried out in any convenient manner. Acrylonitrile containing methyl vinyl ketone can be treated with an aqueous solution of the bisulfite or acrylonitrile containing methyl vinyl ketone can be passed through a bed of solid bisulfite. Alternatively, the bisulfite may be generated "in situ" by employing a mixture of the corresponding sulfite and sulfuric acid in which five parts by volume of a one-molar solution of the sulfite are combined with one part by volume of 1 N sulfuric acid.

The following examples illustrate the process of this invention:

Example I

Approximately 200 grams of acrylonitrile containing approximately 700 parts by weight of methyl vinyl ketone per million parts by weight of acrylonitrile (p. p. m.) was vigorously agitated with 50 ml. of an approximately 1.0% solution of sodium bisulfite for a period of one minute at a temperature of approximately 30° C. The acrylonitrile layer was separated from the reaction mixture and on analysis was found to contain only 300 p. p. m. of methyl vinyl ketone.

Example II

One-hundred-gram samples of acrylonitrile containing approximately 530 parts by weight of methyl vinyl ketone per million parts by weight of acrylonitrile were treated with 50-ml. portions of aqueous solutions of sodium bisulfite having concentrations of approximately 1.3%, 2.6% and 5.2% respectively at a temperature of approximately 25° C. for a period of one minute. In each case the acrylonitrile layer was separated from the reaction mixture and analyzed. The treated samples contained 390, 280, and 195 p. p. m. of methyl vinyl ketone respectively.

Example III

Another 100-gram sample of acrylonitrile containing only 340 p. p. m. of methyl vinyl ketone was treated as in Example II with 50 ml. of an aqueous solution of sodium bisulfite having a concentration of approximately 8% for a period of one minute at approximately 25° C. At the end of that time the methyl vinyl ketone content of the acrylonitrile was 112 p. p. m. After an additional treatment for another four minutes (five minutes total treatment time) analysis of the acrylonitrile indicated that only 60 p. p. m. of methyl vinyl ketone were present.

Example IV

Approximately 50 grams of acrylonitrile containing approximately 700 p. p. m. of methyl vinyl ketone was poured through a 15-cm. bed of solid sodium bisulfite contained in a 1-cm. inside diameter glass tube at a temperature of approximately 30° C. The acrylonitrile issuing from the bed of sodium bisulfite on analysis was found to contain only 400 p. p. m. of methyl vinyl ketone.

The preceding examples illustrate particular embodiments of the novel process of this invention. Substantial variations in the conditions set forth in these examples are possible without departing from the scope of this invention. For example, any of the alkali metal, alkaline earth metal or ammonium bisulfites can be used in this process. These include the sodium, potassium, lithium, magnesium, calcium, and ammonium bisulfites. The reaction can be carried out by treatment of the acrylonitrile with either an aqueous solution of the bisulfite or by treatment with the solid bisulfite. When an aqueous solution of the bisulfite is used, the concentration of the bisulfite in the aqueous solution can be varied substantially as for example, from 0.05% to 10% by weight, depending upon the solubility of the particular bisulfite used. Even higher concentrations of the bisulfite can be used if desired. The quantity of the bisulfite used is also subject to substantial variation and it is preferably employed in excess up to 40-fold of that required to react with the methyl vinyl ketone contained in the acrylonitrile.

The treatment of acrylonitrile in accordance with the process of this invention can be carried out over a wide temperature range, varying from 0° C. to approximately 78° C., the boiling point of acrylonitrile. To prevent any substantial loss of acrylonitrile, the reaction is preferably carried out at a temperature below about 40° C.

After the reaction is complete, substantially pure acrylonitrile can be recovered in any convenient manner well known to those skilled in the art. Distillation of the acrylonitrile from the reaction mixture affords a simple and economical method of recovery.

What is claimed is:

1. A process for the purification of acrylonitrile containing methyl vinyl ketone which comprises treating said acrylonitrile with a minor amount of a compound selected from the group consisting of the alkali metal, the alkaline earth metal and ammonium bisulfites.

2. A process for the purification of acrylonitrile containing methyl vinyl ketone which comprises treating said acrylonitrile with an aqueous solution of a compound selected from the group consisting of the alkali metal, the alkaline earth metal and ammonium bisulfites.

3. A process for the purification of acrylonitrile containing methyl vinyl ketone which comprises treating said acrylonitrile with an aqueous solution of sodium bisulfite.

4. The process as described in claim 3 wherein the treatment is carried out at a temperature below about 40° C.

5. A process for the purification of acrylonitrile containing methyl vinyl ketone which comprises treating said acrylonitrile with a minor amount of a solid compound selected from the group consisting of the alkali metal, alkaline earth metal and the ammonium bisulfites.

6. A process for the purification of acrylonitrile containing methyl vinyl ketone which comprises treating said acrylonitrile with a minor amount of solid sodium bisulfite.

7. A process for the purification of acrylonitrile containing methyl vinyl ketone which comprises treating said acrylonitrile with a minor amount of solid sodium bisulfite at a temperature below about 40° C.

References Cited in the file of this patent

UNITED STATES PATENTS

| | | |
|---|---|---|
| 2,494,087 | Daniels | Jan. 10, 1950 |
| 2,678,945 | Taylor | May 18, 1954 |